(12) United States Patent
Pietrusynski

(10) Patent No.: US 6,293,448 B1
(45) Date of Patent: Sep. 25, 2001

(54) MOUNTABLE LOCKING KNIFE SCABBARD

(76) Inventor: Martin S. Pietrusynski, 4001 W. Loomis Rd., Milwaukee, WI (US) 53221

( * ) Notice: Subject to any disclaimer, the term of this patent is extended or adjusted under 35 U.S.C. 154(b) by 0 days.

(21) Appl. No.: 09/628,048

(22) Filed: Jul. 27, 2000

(51) Int. Cl.[7] .............. B62J 9/02; B62J 11/00; B26B 29/02
(52) U.S. Cl. .............. 224/413; 30/151; 224/232
(58) Field of Search .................... 224/232, 233, 224/413; 30/151

(56) References Cited

U.S. PATENT DOCUMENTS

| | | | | |
|---|---|---|---|---|
| 3,246,813 | * | 4/1966 | Miller | 30/151 |
| 4,211,003 | * | 7/1980 | Collins | 224/232 |
| 4,404,747 | * | 9/1983 | Collins | 224/232 |
| 4,558,516 | * | 12/1985 | Collins | 30/151 |
| 4,726,498 | * | 2/1988 | Esposito | 224/232 |
| 4,854,044 | * | 8/1989 | Collins | 30/151 |
| 5,138,768 | * | 8/1992 | Collins | 30/151 |
| 5,155,911 | * | 10/1992 | Collins | 30/151 |
| 5,915,793 | * | 6/1999 | Serpa | 30/151 |
| 5,926,959 | * | 7/1999 | Collins | 30/151 |

* cited by examiner

*Primary Examiner*—Stephen P. Garbe
(74) *Attorney, Agent, or Firm*—Donald J. Ersler

(57) ABSTRACT

A mountable locking knife scabbard includes a locking carrying frame, knife sheath, knife, and locking pin. The locking carrying frame has at least one slot which is sized to facilitate fastening to a surface. The knife sheath is fastened to the locking carrying frame. The knife sheath is sized to receive the knife. The knife and locking carrying frame have openings formed through thereof to receive a locking pin. The locking pin has a head on one end and a bolt opening formed through the other end which is sized to receive a padlock bolt. When the padlock bolt is inserted through the bolt opening; the padlock does not allow the knife to be withdrawn from the knife sheath.

15 Claims, 4 Drawing Sheets

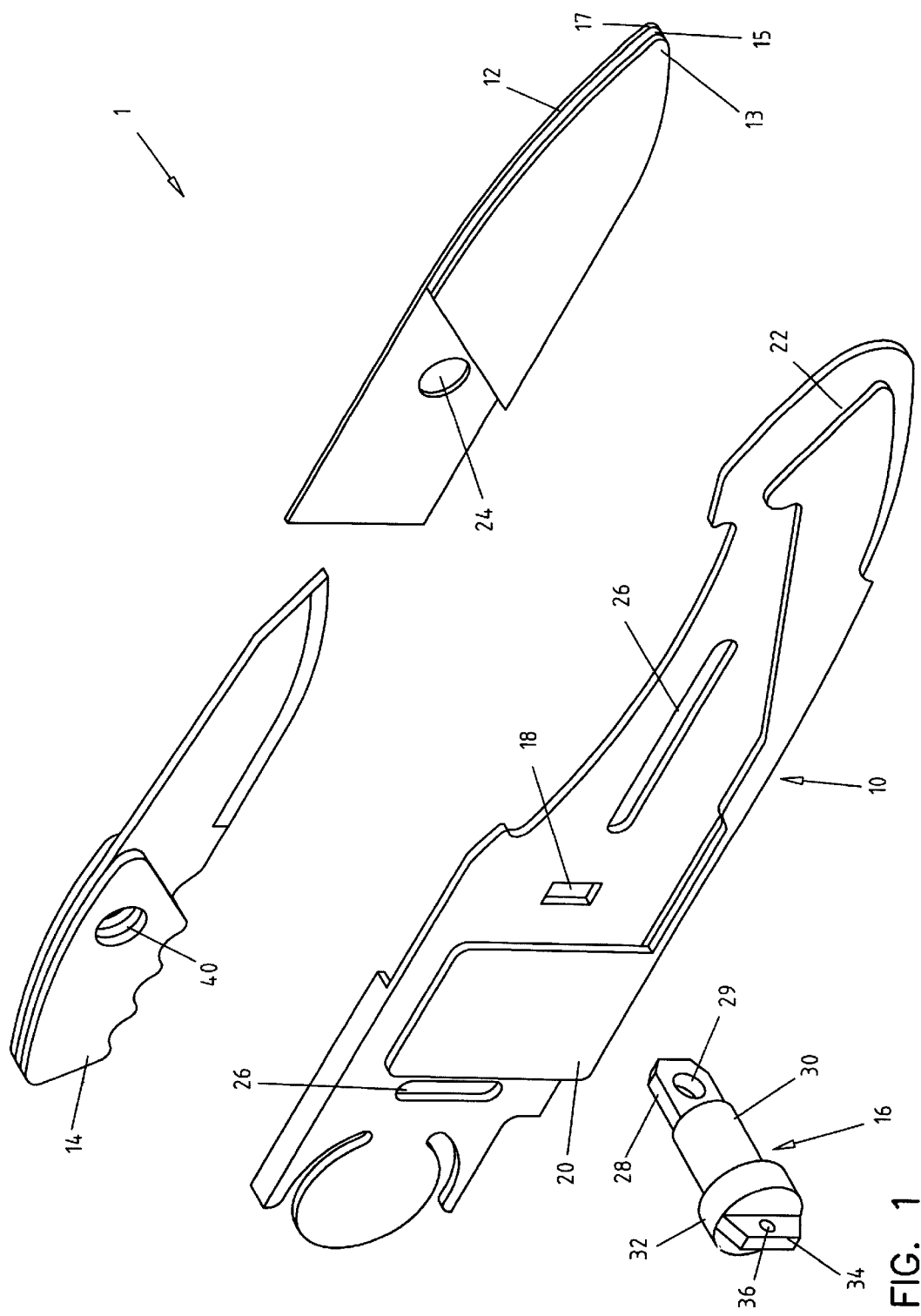

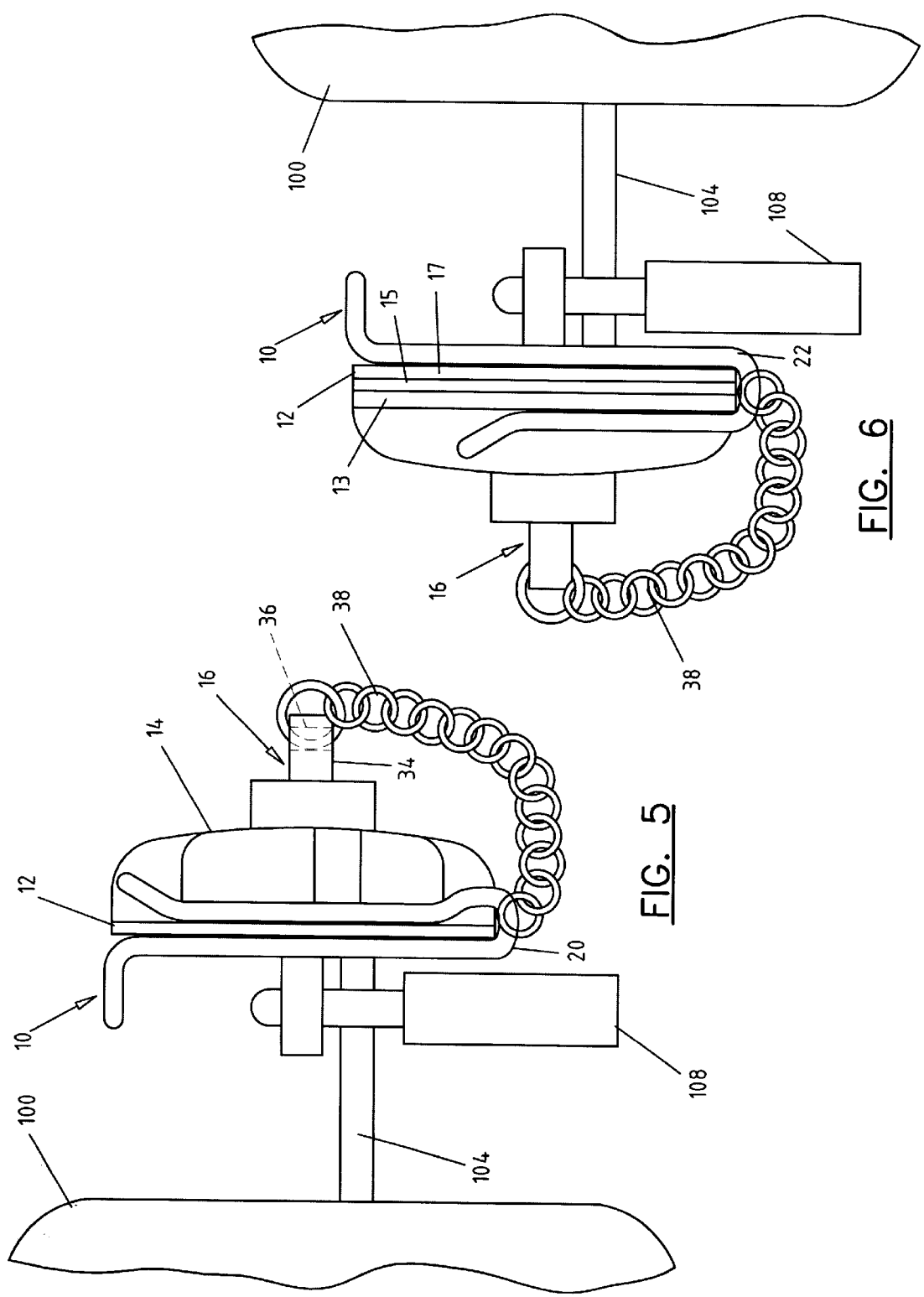

MOUNTABLE LOCKING KNIFE SCABBARD

BACKGROUND OF THE INVENTION

1. Field of the Invention

The present invention relates generally to knife sheaths and more specifically to a mountable locking knife scabbard which may be fastened to a surface on a motor vehicle to allow legal transportation of a hunting knife.

2. Discussion of the Prior Art

Motorcycle enthusiasts commonly attend large outdoor meetings. There is rarely enough hotel space to house the attendees of these meetings. A lack of hotel space forces the attendees to camp out. A large hunting knife is a necessity for camping out. Setting up tents, cutting wood for fires, cutting meat, and other activities are facilitated with a large hunting knife. However, keeping the knife secured in an accessible place is also necessary, because carrying a hunting knife on one's person is illegal in most states.

Accordingly, there is a clearly felt need in the art for a mountable locking knife scabbard which securely retains a knife, yet keeps it available in an accessible place for various uses.

SUMMARY OF THE INVENTION

The present invention provides a mountable locking knife scabbard which allows a hunting knife to be legal transported on a motor vehicle. The mountable locking knife scabbard includes a locking carrying frame, knife sheath, knife, and locking pin. The locking carrying frame has at least one slot which is sized to facilitate fastening to a motor vehicle (such as a motorcycle) or any other mounting surface. The knife sheath is cradled in the locking carrying frame. The knife sheath is sized to receive the knife. The knife, knife sheath, and locking carrying frame have openings formed through thereof to receive a locking pin. The locking pin has a head on one end and a bolt opening formed through the other end which is sized to receive a padlock. When a bolt of the padlock is secured in the lock opening; the padlock does not allow the knife to be withdrawn from the knife sheath.

Accordingly, it is an object of the present invention to provide a locking knife scabbard which is mountable to a motor vehicle.

Finally, it is another object of the present invention to provide a locking knife scabbard which allows a large hunting knife to be legally transported while being disposed an accessible place.

These and additional objects, advantages, features and benefits of the present invention will become apparent from the following specification.

BRIEF DESCRIPTION OF THE DRAWINGS

FIG. 1 is an exploded perspective view of a locking knife scabbard in accordance with the present invention.

FIG. 5 is a left end view of a locking knife scabbard attached to an air cleaner of a motorcycle in accordance with the present invention.

FIG. 6 is a right end view of a locking knife scabbard attached to an air cleaner of a motorcycle in accordance with the present invention.

DETAILED DESCRIPTION OF THE PREFERRED EMBODIMENTS

Figure 1A:
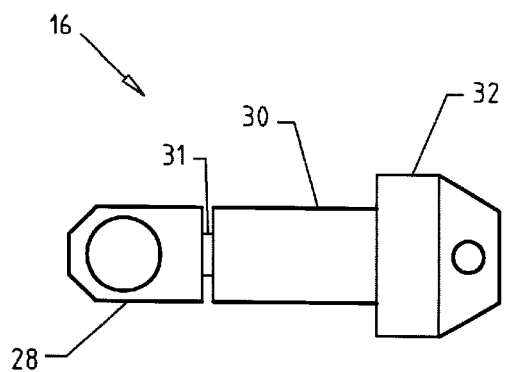
FIG. 1a is a top view of a locking pin in accordance with the present invention.
Figure 2:
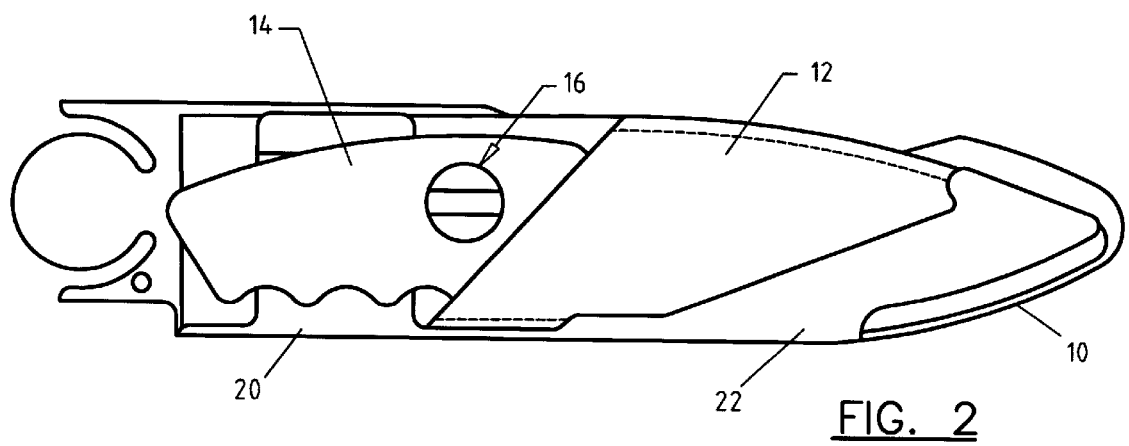
FIG. 2 is a front view of a knife retained in a locking knife sheath in accordance with the present invention.
Figure 3:
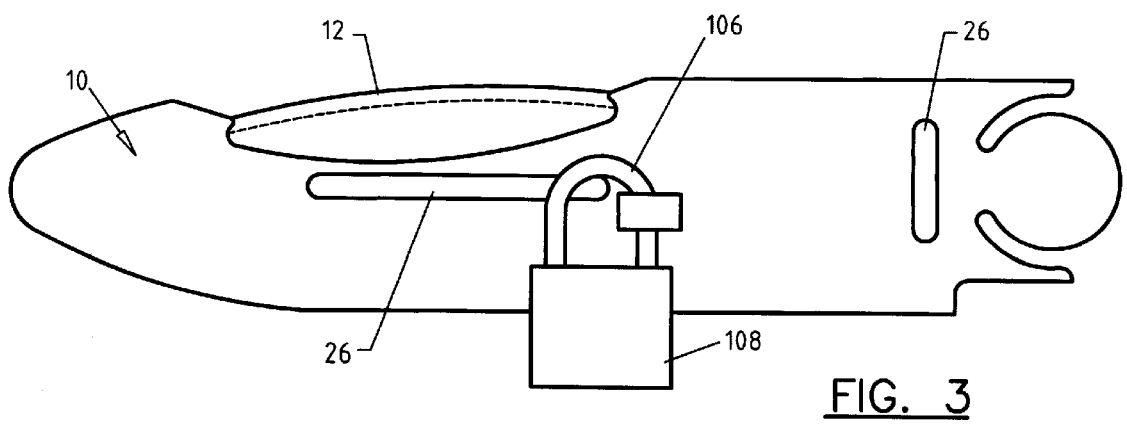
FIG. 3 is a rear view of a knife retained in a locking knife scabbard in accordance with the present invention.

With reference now to the drawings, and particularly to FIG. 1, there is shown an exploded perspective view of a mountable locking knife scabbard 1. With reference to FIGS. 2 and 3, the mountable locking knife scabbard 1 includes a locking carrying frame 10, knife sheath 12, knife 14, and locking pin 16. The locking carrying frame 10 preferably has a first clip 20 and a second clip 22. The first and second clips are sized to receive the knife sheath 12. The locking pin 16 includes a locking end 28, a body 30, and a head 32. A bolt opening 29 is formed through the locking end 28 which provides clearance for a bolt 106 of a padlock 108. A projection 34 extends outward from a front of the head 32. With reference to FIG. 5, a chain hole 36 is formed through the projection 34 which is sized to receive a retention chain 38. The other end of the retention chain 38 is attached to the locking carrying frame 10. With reference to figure 1a, a reduced diameter 31 is formed between the locking end 28 and the body 30. The length (the distance between the locking end 28 and the body 30) of the reduced diameter 31 is greater than the thickness of the locking carrying frame 10.

Figure 4:
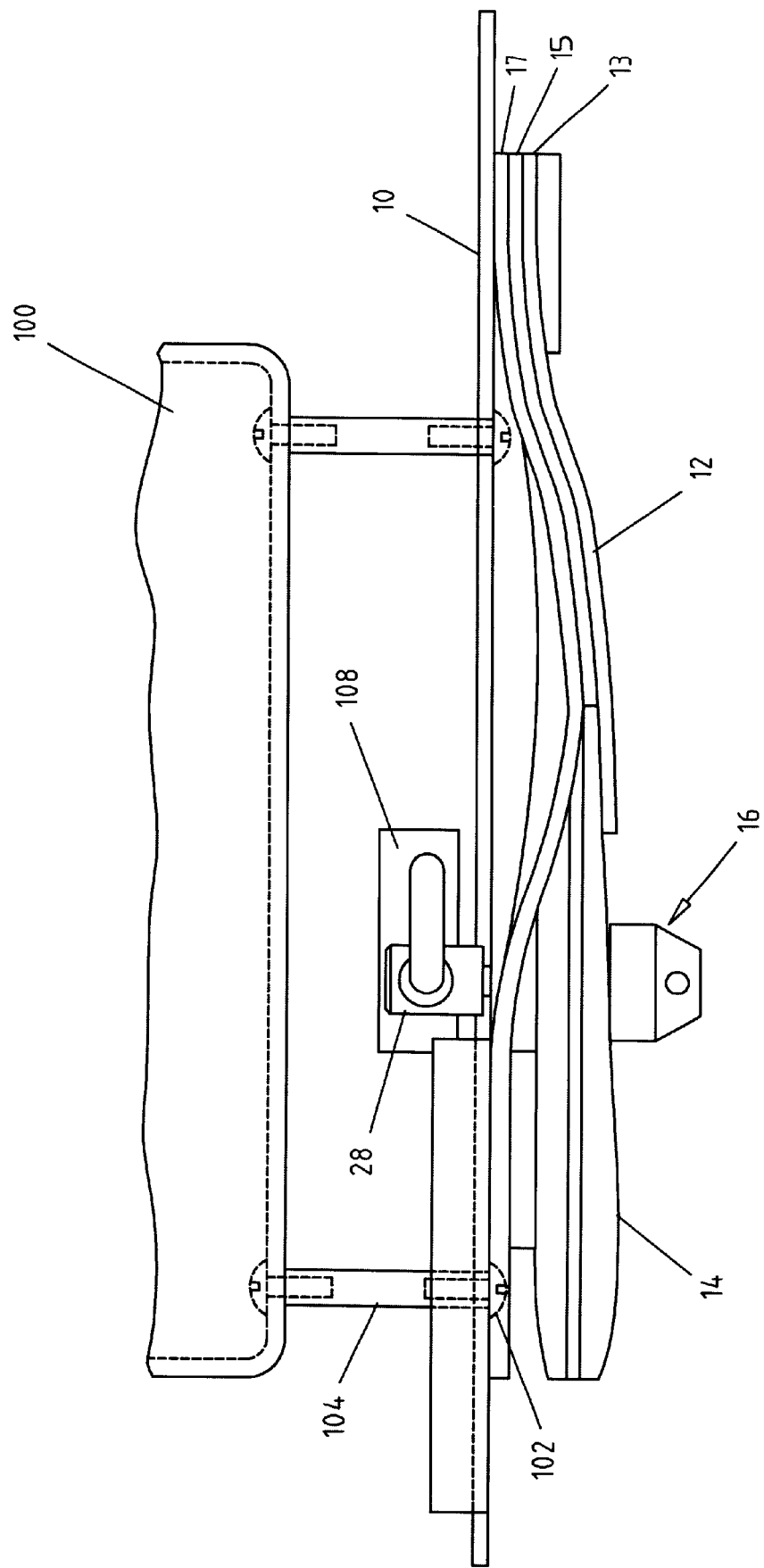
FIG. 4 is a top view of a locking knife scabbard attached to an air cleaner of a motorcycle in accordance with the present invention.

A lock slot 18 is formed through the locking carrying frame 10 to receive the locking end 28 of the locking pin 16. A pin opening 24 is formed through the knife sheath 12 to provide clearance for the body 30. A pin hole 40 is formed through substantially the middle of the knife 14 to slidably receive the body 30 of the locking pin 16. The knife sheath 12 is preferably fabricated from a first outer layer 13, an inner layer 15, and a second outer layer 17 joined on the perimeters thereof with any suitable assembly method. The three layers are preferably fabricated from leather. With reference to FIGS. 4–6, the locking carrying frame 10 has at least one slot 26 which is sized to receive a screw 102 (or other fastener) for attachment to a stand-off 104 of a motorcycle air cleaner 100 or any other suitable attachment surface (other than the stand-off 104).

The knife 14 is preferably secured to the mountable locking knife scabbard 1 in the following manner. First, the locking carrying frame 10 is preferably attached to the air cleaner 100 of a motorcycle as previously described, but may be attached to any other suitable surface on the motorcycle. The locking carrying frame 10 could also be attached to some other type of motor vehicle or another object such as a work bench, a wall, or any other convenient mounting surface. The ability of the knife 14 to be secured in the locking carrying frame 10 also prevents children from injuring themselves.

The knife sheath 12 is inserted into the first and second clips of the locking carrying frame 10. The pin opening 24 in the knife sheath 12 is centered over the lock slot 18. The knife 14 is inserted into the knife sheath 12 and the pin hole 40 is centered over the pin opening 24. The locking pin 16 is then inserted through the knife 14, the knife sheath 12, and the locking carrying frame 10. The reduced diameter 31 allows the locking pin 16 to be twisted 90 degrees to lock thereof in place until the bolt 106 of the padlock 108 is inserted through the bolt hole 29 in the locking end 28. The knife 14 may not be withdrawn from the locking knife scabbard 1 until the padlock 108 is removed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A locking knife scabbard comprising:
    a locking carrying frame having a lock slot disposed substantially in the middle of said locking carrying frame, said locking carrying frame being capable of being attached to a mounting surface;
    a knife sheath being attached to said locking carrying frame;
    a knife being insertable into said knife sheath; and
    a locking pin having a locking end, a pin opening being formed through said knife and said knife sheath, said pin opening being aligned with said locking end opening to allow insertion of said locking pin through said knife, knife sheath, and locking carrying frame.

2. The locking knife scabbard of claim 1, further comprising:
    a bolt opening being formed through said locking end of said locking pin, a bolt of a padlock being inserted through said opening to lock said knife to said locking carrying frame.

3. The locking knife scabbard of claim 1, further comprising:
    a first clip extending from a first end of said locking carrying frame, a second clip extending from a second end of said locking carrying frame, said knife sheath being inserted into said first and second clips to retain thereof in relation to said locking carrying frame.

4. The locking knife scabbard of claim 1, wherein:
    said locking pin including said locking end, a body, and a head, said locking end being formed on one end of said body and said head on the opposite end thereof, a reduced diameter being formed between said locking end and said body, said reduced diameter allowing said locking pin to be twisted relative to said locking body.

5. The locking knife scabbard of claim 1, further comprising:
    a projection extending from a front of said head, a hole being formed through said head, one end of a retention chain being attached to said hole in said projection, the other end of said retention chain being attached to said locking body.

6. The locking knife scabbard of claim 1, wherein:
    at least one slot being formed in said locking carrying frame for mounting thereof to a mounting surface.

7. A locking knife scabbard comprising:
    a locking carrying frame having a lock slot disposed substantially in the middle of said locking carrying frame, said locking carrying frame being capable of being attached to a surface;
    a knife sheath being attached to said locking carrying frame;
    a knife being insertable into said knife sheath;
    a locking pin having a locking end, a pin hole being formed through said knife and said knife sheath, said pin hole being aligned with said locking end opening to allow insertion of said locking pin through said knife, knife sheath, and locking carrying frame; and
    a bolt opening being formed through said locking end of said locking pin, a bolt of a padlock being inserted through said opening to lock said knife to said locking carrying frame.

8. The locking knife scabbard of claim 7, further comprising:
    a first clip extending from a first end of said locking carrying frame, a second clip extending from a second end of said locking carrying frame, said knife sheath being inserted into said first and second clips to retain thereof in relation to said locking carrying frame.

9. The locking knife scabbard of claim 7, where in:
    said locking pin including said locking end, a body, and a head, said locking end being formed on one end of said body and said head on the opposite end thereof, a reduced diameter being formed between said locking end and said body, said reduced diameter allowing said locking pin to be rotated relative to said locking body.

10. The locking knife scabbard of claim 7, further comprising:
    a projection extending from a front of said head, a hole being formed through said head, one end of a retention chain being attached to said hole in said projection, the other end of said retention chain being attached to said locking body.

11. The locking knife scabbard of claim 7, wherein:
    at least one slot being formed in said locking carrying frame for mounting thereof to a mounting surface.

12. A locking knife scabbard comprising:
    a knife sheath;
    a locking carrying frame having a first clip extending from a first end thereof, a second clip extending from a second end thereof, said knife sheath being inserted into said first and second clips, a lock slot disposed substantially in the middle of said locking carrying frame, said locking carrying frame being capable of being attached to a mounting surface;
    a knife being insertable into said knife sheath;
    a locking pin having a locking end, a pin hole being formed through said knife and said knife sheath, said pin opening being aligned with said locking end opening to allow insertion of said locking pin through said knife, knife sheath, and locking carrying frame; and
    a bolt opening being formed through said locking end of said locking pin, a bolt of a padlock being inserted through said opening to lock said knife to said locking carrying frame.

13. The locking knife scabbard of claim 12, wherein:
    said locking pin including said locking end, a body, and a head, said locking end being formed on one end of said body and said head on the opposite end thereof, a reduced diameter being formed between said locking end and said body, said reduced diameter allowing said locking pin to be rotated relative to said locking body.

14. The locking knife scabbard of claim 12, further comprising:
    a projection extending from a front of said head, a hole being formed through said head, one end of a retention chain being attached to said hole in said projection, the other end of said retention chain being attached to said locking body.

15. The locking knife scabbard of claim 12, wherein:
    at least one slot being formed in said locking carrying frame for mounting thereof to a mounting surface.

* * * * *